US011099012B2

(12) United States Patent
Nagai et al.

(10) Patent No.: US 11,099,012 B2
(45) Date of Patent: Aug. 24, 2021

(54) AERIAL VEHICLE AND CONTROL METHOD FOR AERIAL VEHICLE

(71) Applicant: HONDA MOTOR CO., LTD., Tokyo (JP)

(72) Inventors: Makoto Nagai, Wako (JP); Yo Ito, Tokyo (JP); Takahiro Iijima, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 16/982,104

(22) PCT Filed: Mar. 19, 2019

(86) PCT No.: PCT/JP2019/011353
§ 371 (c)(1),
(2) Date: Sep. 18, 2020

(87) PCT Pub. No.: WO2019/181908
PCT Pub. Date: Sep. 26, 2019

(65) Prior Publication Data
US 2021/0095960 A1    Apr. 1, 2021

(30) Foreign Application Priority Data

Mar. 19, 2018  (JP) .............................. JP2018-051394

(51) Int. Cl.
*G01C 5/00*         (2006.01)
*B64D 45/00*        (2006.01)
(Continued)

(52) U.S. Cl.
CPC ............. *G01C 5/005* (2013.01); *B64D 47/06* (2013.01); *H04L 67/12* (2013.01); *B64C 39/024* (2013.01); *B64C 2201/027* (2013.01)

(58) Field of Classification Search
CPC . G01C 5/005; G01C 5/00; G01D 1/00; G08G 5/04; H04N 5/232; H04N 5/84;
(Continued)

(56) References Cited

U.S. PATENT DOCUMENTS 3,204,237 A  *  8/1965  Overcash ................ G01S 13/78
                                                   342/46
3,528,070 A  *  9/1970  Young, Jr. ................ A63H 3/36
                                                   342/67

(Continued)

FOREIGN PATENT DOCUMENTS

CN       105292455       2/2016
CN       105629991       6/2016
(Continued)

OTHER PUBLICATIONS

International Search Report and Written Opinion for International Application No. PCT/JP2019/011353 dated May 14, 2019, 10 pages.

(Continued)

*Primary Examiner* — Yuri Kan
(74) *Attorney, Agent, or Firm* — Amin, Turocy & Watson LLP

(57) ABSTRACT

The present invention provides an aerial vehicle for which flight information for the aerial vehicle can be identified by people in the surrounding area. Also provided is a control method for the aerial vehicle. The aerial vehicle is provided with a display device that displays toward the exterior of the vehicle and a display control device that controls the display device. In addition, the aerial vehicle is provided with an altitude acquisition device that acquires altitude as the distance from the ground surface. The display control device
(Continued)

is provided with an altitude display control unit that selectively performs display on the display device on the basis of the altitude.

10 Claims, 7 Drawing Sheets

(51) Int. Cl.
*G08B 21/00* (2006.01)
*G09F 9/00* (2006.01)
*B60Q 1/34* (2006.01)
*G08G 5/04* (2006.01)
*H04N 5/84* (2006.01)
*B64D 47/06* (2006.01)
*H04L 29/08* (2006.01)
*B64C 39/02* (2006.01)

(58) Field of Classification Search
CPC .......... B64D 45/00; B64D 1/18; B64D 47/06; G08B 21/00; F41G 7/24; A63H 3/00; G01S 13/78; B60Q 1/34; B64C 27/08
See application file for complete search history.

(56) References Cited

U.S. PATENT DOCUMENTS

| | | | | |
|---|---|---|---|---|
| 3,752,914 A | * | 8/1973 | England | H04N 9/43 348/32 |
| 6,568,627 B1 | * | 5/2003 | Jones | F41G 7/26 244/3.11 |
| 9,736,360 B2 | * | 8/2017 | Sasaki | G01C 11/06 |
| 2009/0303081 A1 | * | 12/2009 | Annati | B64D 47/06 340/945 |
| 2016/0280396 A1 | * | 9/2016 | Schoen | B64D 47/06 |
| 2016/0306351 A1 | * | 10/2016 | Fisher | G05D 1/0016 |
| 2017/0305550 A1 | * | 10/2017 | Whitmarsh | B64D 1/18 |
| 2017/0329325 A1 | * | 11/2017 | Hong | G05D 1/0016 |
| 2019/0206269 A1 | * | 7/2019 | Chen | G06K 9/0063 |
| 2019/0248507 A1 | * | 8/2019 | Fox | B64D 45/0015 |

FOREIGN PATENT DOCUMENTS

| | | | | |
|---|---|---|---|---|
| JP | 61-173183 | | 8/1986 | |
| JP | 06-255594 | | 9/1994 | |
| JP | 2016-124503 | | 7/2016 | |
| JP | 2016124503 A | * | 7/2016 | .............. B60Q 1/34 |
| JP | 2017-107039 | | 6/2017 | |
| JP | 2017107039 A | * | 6/2017 | ............. B64C 39/02 |
| JP | 2017-170920 | | 9/2017 | |
| WO | 2011/057453 | | 5/2011 | |
| WO | 2017/065107 | | 4/2017 | |

OTHER PUBLICATIONS

Extended European Search Report for European Patent Application No. 19771791.1 dated May 3, 2021.

* cited by examiner

US 11,099,012 B2

AERIAL VEHICLE AND CONTROL METHOD FOR AERIAL VEHICLE

TECHNICAL FIELD

The present invention relates to a flying body (aerial vehicle) that includes a display apparatus for providing a display outward and to a control method of the flying body (aerial vehicle).

BACKGROUND ART

In Japanese Laid-Open Patent Publication No. 2017-107039, an apparatus that displays video using a light emitting body has an objective of making the video easy to see even when the surrounding conditions change (paragraph [0004] and the ABSTRACT). To achieve this objective, in Japanese Laid-Open Patent Publication No. 2017-107039 (the ABSTRACT and FIG. 1), the flying mechanism 10 provides a mechanism that causes an apparatus that generates lift through the rotation of each rotating wing 11 to move itself through the air, i.e., to fly. The distance information acquiring section 30 acquires distance information indicating the distance between the apparatus itself and a user.

The frame body 50 is provided with a plurality of LEDs that are lined up, and moves repeatedly along a determined trajectory. When the frame body 50 moves along the determined trajectory, the light emitting control section 70 controls the light emission period of the plurality of LEDs such that the light emitted by the plurality of LEDs displays the video. The changing section 90 changes the brightness of the video being displayed, according to a prescribed condition. The changing section 90 changes the brightness of the video using, as the prescribed condition, the distance between the apparatus itself and the user, which is indicated by the distance information acquired by the distance information acquiring section 30.

The altitude of the apparatus itself can be used as this prescribed condition (Claim 4 and paragraphs [0062] to [0067]). By increasing the brightness of the video as the altitude of the apparatus itself becomes higher, it is possible to make the video easier to see even when the flight altitude is high (paragraph [0065]). Furthermore, even when a backward light portion and a forward light portion change according to the altitude of the apparatus itself, it is possible to change the brightness of the image to make the video of these changed portions easier to see (paragraph [0067]).

SUMMARY OF INVENTION

As described above, in Japanese Laid-Open Patent Publication No. 2017-107039, the video is intended to be made easier to see even when the flight altitude becomes higher, by increasing the brightness of the video as the altitude of the apparatus itself becomes higher (paragraph [0065]). Furthermore, the brightness of the video is intended to be changed such that the video of the changed portions become easier to see when the backward light portion and the forward light portion are changed according to the altitude of the apparatus itself (paragraph [0067]). In other words, through these measures, the way of viewing the video is intended to remain unchanged even when the altitude of the apparatus itself changes.

However, in Japanese Laid-Open Patent Publication No. 2017-107039, there is no consideration made to actively notifying nearby people about the flight information such as the altitude of the apparatus itself (flying body).

The present invention has been devised in order to solve this type of problem, and has the object of providing, a flying body and a flying body control method that make it possible for nearby people to recognize the flight information of the flying body.

A flying body according to one aspect of the present invention is a flying body including a display apparatus configured to provide a display outward and a display control apparatus configured to control the display apparatus, wherein the flying body further includes an altitude acquiring apparatus configured to acquire an altitude as a distance to a ground surface, and the display control apparatus includes an altitude display control section configured to selectively provide the display of the display apparatus based on the altitude acquired by the altitude acquiring apparatus.

According to the present invention, the display of the display apparatus facing the outside of the flying body is provided selectively based on the altitude. In this way, people near the flying body can recognize the altitude of the flying body from the ground.

The flying body may further include a progression direction acquiring apparatus configured to acquire a progression direction of the flying body, and the display control apparatus may further include a progression direction display control section configured to selectively provide the display of the display apparatus based on the progression direction acquired by the progression direction acquiring apparatus. In this way, people near the flying body can recognize the altitude and the progression direction of the flying body from the ground.

The display apparatus may include two or more light emitting sections each having a light emission amount and an emitted light color that are changeable. Furthermore, the progression direction display control section may be configured to display the progression direction of the flying body using an order of change of the light emission amounts of the two or more light emitting sections. Yet further, the altitude display control section may be configured to display the altitude of the flying body using a change of the emitted light colors of the light emitting sections. In this way, since the altitude and progression direction of the flying body are indicated by identical light emitting sections, it is possible to make the display apparatus compact.

The altitude acquiring apparatus may include an emitting section configured to emit an electromagnetic wave toward the ground surface; a receiving section configured to receive a reflection wave of the electromagnetic wave; and an altitude calculating section configured to calculate the altitude based on the reflection wave. Furthermore, the flying body may include a posture detecting section configured to detect pitch or roll of the flying body; an orientation adjusting mechanism configured to adjust orientations of the emitting section and the receiving section; and an orientation control section configured to control the orientation adjusting mechanism based on the pitch or the roll in a manner to orient the emitting section and the receiving section in a direction of gravity. In this way, it is possible to reduce the detection error in the altitude caused by the pitch or roll of the flying body.

The flying body may include a communication apparatus configured to perform wireless communication with an external device. Furthermore, the display control apparatus may provide the display of the display apparatus indicating the altitude when an altitude display command is received from the external device via the communication apparatus. In this way, it is possible to switch the display aspect of the display apparatus as needed.

A control method according to another aspect of the present invention is a control method of a flying body including a display apparatus configured to provide a display outward and a display control apparatus configured to control the display apparatus, wherein the flying body further includes an altitude acquiring apparatus configured to acquire an altitude as a distance to a ground surface, and the display control apparatus includes an altitude display control section configured to selectively provide the display of the display apparatus based on the altitude acquired by the altitude acquiring apparatus.

A flying body according to yet another aspect of the present invention is a flying body including a display apparatus configured to provide a display outward and a display control apparatus configured to control the display apparatus, wherein the flying body further includes a progression direction acquiring apparatus configured to acquire a progression direction of the flying body, and the display control apparatus includes a progression direction display control section configured to selectively provide the display of the display apparatus based on the progression direction acquired by the progression direction acquiring apparatus.

According to the present invention, the display of the display apparatus facing the outside of the flying body is provided selectively based on the progression direction. In this way, people near the flying body can recognize the progression direction of the flying body from the ground.

The display apparatus may include two or more light emitting sections each having a light emission amount and an emitted light color that are changeable. The progression direction display control section may be configured to display the progression direction of the flying body using an order of change of the light emission amounts of the two or more light emitting sections. In this way, it is possible to indicate the progression direction of the flying body with a simple configuration.

A control method according to yet another aspect of the present invention is a control method of a flying body including a display apparatus configured to provide a display outward and a display control apparatus configured to control the display apparatus, wherein the flying body further includes a progression direction acquiring apparatus configured to acquire a progression direction of the flying body, and the display control apparatus includes a progression direction display control section configured to selectively provide the display of the display apparatus based on the progression direction acquired by the progression direction acquiring apparatus.

A flying body according to yet another aspect of the present invention is a flying body including a display apparatus configured to provide a display outward and a display control apparatus configured to control the display apparatus, wherein the flying body further includes an other-machine velocity acquiring apparatus configured to acquire an other-machine velocity that is a velocity of another flying body positioned near the flying body, and the display control apparatus includes a for-other-machine display control section configured to selectively provide the display of the display apparatus based on the other-machine velocity acquired by the other-machine velocity acquiring apparatus.

The display apparatus may include a light emitting section having a light emission amount that is changeable, and the for-other-machine display control section may be configured to change the light emission amount of the light emitting section based on the other-machine velocity.

The for-other-machine display control section may be configured to change the light emission amount of the light emitting section in a manner that the light emission amount of the light emitting section at a timing when the other-machine velocity is a first velocity becomes greater than the light emission amount of the light emitting section at a timing when the other-machine velocity is a second velocity that is less than the first velocity.

A flying body according to yet another aspect of the present invention is a flying body including a display apparatus configured to provide a display outward and a display control apparatus configured to control the display apparatus, wherein the flying body further includes an other-machine distance acquiring apparatus configured to acquire an other-machine distance that is a distance between the flying body and another flying body positioned near the flying body, and the display control apparatus includes a for-other-machine display control section configured to selectively provide the display of the display apparatus based on the other-machine distance acquired by the other-machine distance acquiring apparatus.

The display apparatus may include a light emitting section having a light emission amount that is changeable, and the for-other-machine display control section may be configured to change the light emission amount of the light emitting section based on the other-machine distance.

The for-other-machine display control section may be configured to change the light emission amount of the light emitting section in a manner that the light emission amount of the light emitting section at a timing when the other-machine distance is a first distance becomes greater than the light emission amount of the light emitting section at a timing when the other-machine distance is a second distance that is less than the first distance.

According to the present invention, nearby people can recognize the flight information of the flying body itself.

DESCRIPTION OF EMBODIMENTS

A. First Embodiment

<A-1. Configuration>
[A-1-1. Overall Configuration]

Figure 1:
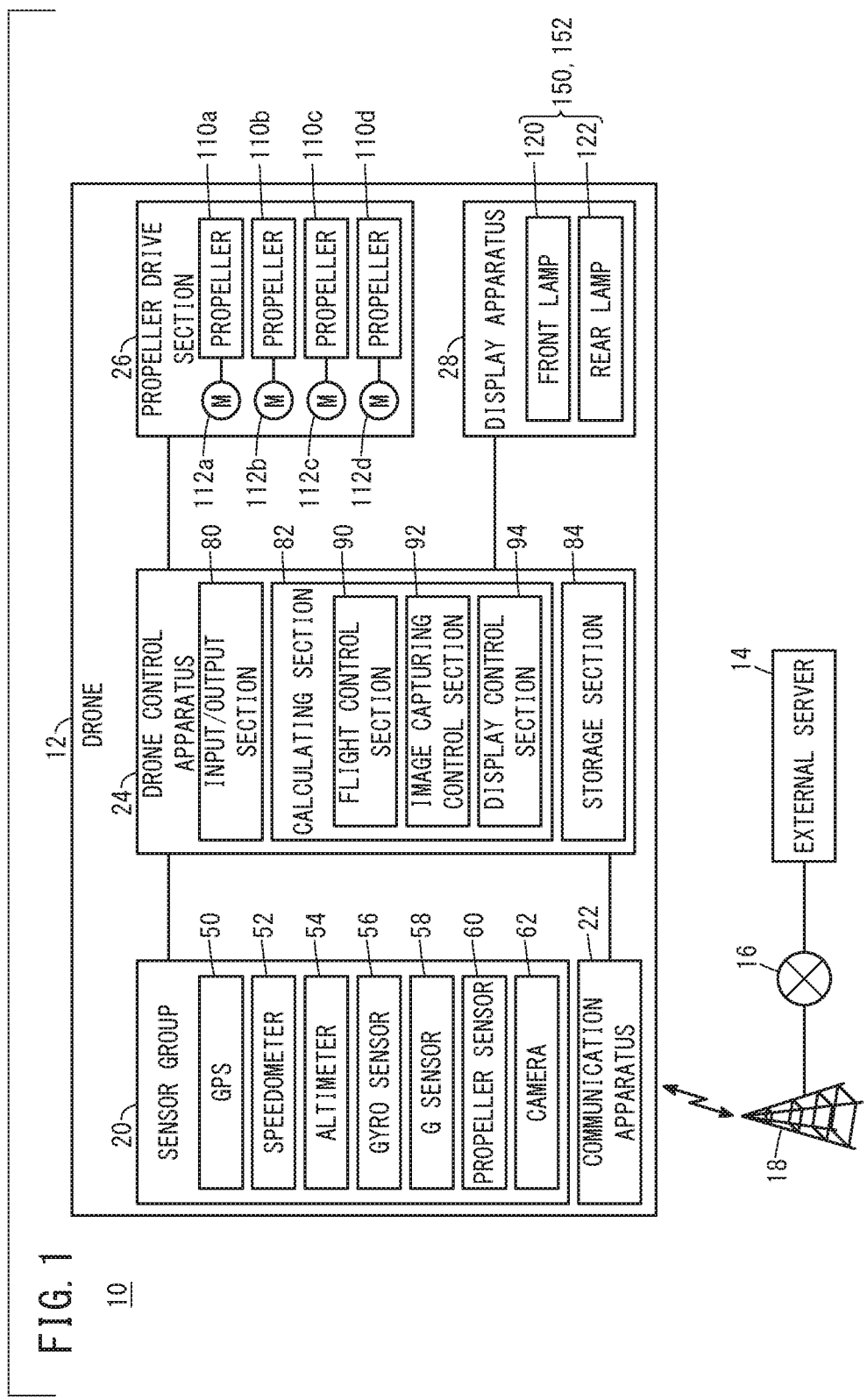
FIG. 1 is an overall configurational diagram of the basics of a drone system that includes a drone serving as a flying body, according to a first embodiment of the present invention.
Figure 2:
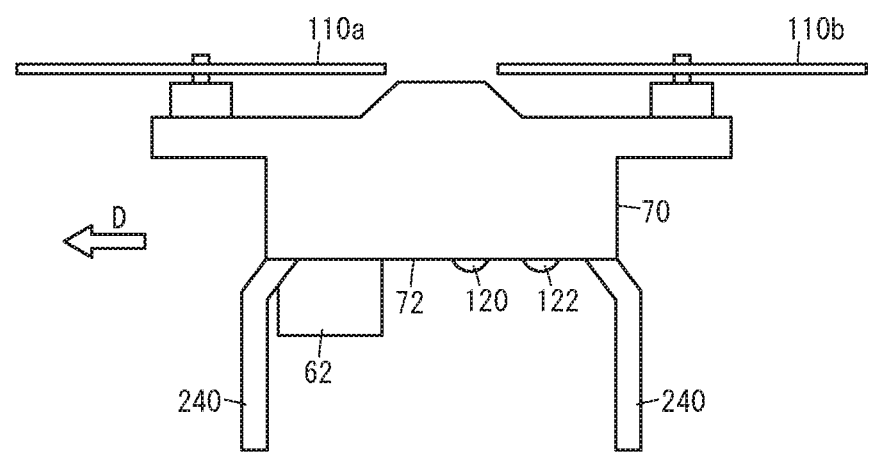
FIG. 2 is a side view showing a simplified external appearance of the drone according to the first embodiment.

FIG. 1 is an overall configurational diagram of the basics of a drone system 10 that includes a drone 12 serving as a flying body, according to a first embodiment of the present invention. FIG. 2 is a side view showing a simplified external appearance of the drone 12 according to the first embodiment. The drone system 10 includes an external server 14, in addition to the drone 12. The drone 12 is used for image capturing, and transmits an image Id obtained by capturing an image of the surroundings to the external server 14, while flying according to a flight command received from the external server 14 via the Internet 16 and a wireless relay station 18. As described further below, the drone 12 may be used for other purposes. As shown in FIG. 1, the drone 12 includes a sensor group 20, a communication apparatus 22, a drone control apparatus 24, a propeller drive section 26, and a display apparatus 28.

[A-1-2. Sensor Group 20]

The sensor group 20 includes a global positioning system sensor 50 (referred to below as a "GPS sensor 50"), a speedometer 52, an altimeter 54, a gyro sensor 56, an acceleration sensor 58, a propeller rotational velocity sensor 60, and a camera 62. The GPS sensor 50 detects a current position Pdcur of the drone 12. The speedometer 52 detects a flight velocity Vd [km/h] of the drone 12.

The altimeter 54 detects a ground altitude H (also referred to below as the "altitude H") [m] of the drone 12, as the distance to the ground (e.g., the distance downward from the drone 12 to the ground surface). The altimeter 54 (altitude acquiring apparatus) of the first embodiment detects the altitude H using a time of flight (TOF) method. The altimeter 54 includes an output section, a receiving section, and an altitude calculating section (not shown in the drawings) that are the same as an emitting section 210, a receiving section 212, and an altitude calculating section 214 (FIG. 6) of an altimeter 54a of a second embodiment.

The gyro sensor 56 detects an angular velocity ω [rad/sec] of the drone 12. The angular velocity ω includes an angular velocity Y relative to an up-down axis (referred to below as "yaw Y"), an angular velocity P relative to a left-right axis (referred to below as "pitch P"), and an angular velocity R relative to a front-rear axis (referred to below as "roll R"). The acceleration sensor 58 detects the acceleration G [m/sec/sec] of the drone 12. The acceleration G includes an acceleration Gx in a front-rear direction, an acceleration Gy in a left-right direction, and an acceleration Gz in an up-down direction. The propeller rotational velocity sensor 60 (also referred to below as a "propeller sensor 60") detects the rotational velocity Np [rpm] of each propeller 110.

As shown in FIG. 2, the camera 62 is arranged on a bottom surface 72 of a main body 70 of the drone 12 (also referred to below as a "drone body 70"), and acquires an image Id of the drone 12 (also referred to below as a "drone image Id"). The camera 62 is a video camera that captures a moving image. Alternatively, the camera 62 may be capable of capturing both a moving image and a still image, or only a still image. The camera 62 of the first embodiment can adjust its orientation (posture of the camera 62 relative to the drone body 70) using a camera actuator (not shown in the drawings). Alternatively, the camera 62 may be positionally fixed relative to the drone body 70.

[A-1-3. Communication Apparatus 22]

The communication apparatus 22 is capable of performing wireless communication with the wireless relay station 18 and the like, and includes a wireless antenna, for example. The communication apparatus 22 is capable of communicating with the external server 14 and the like via the wireless relay station 18 and the Internet 16.

[A-1-4. Drone Control Apparatus 24]

The drone control apparatus 24 performs controls the entire drone 12, such as the flight and image capturing of the drone 12. As shown in FIG. 1, the drone control apparatus 24 includes an input/output section 80, a calculating section 82, and a storage section 84.

The calculating section 82 includes a central processing unit (CPU), and operates by executing a program stored in the storage section 84. Some of the functions performed by the calculating section 82 can be realized using a logic IC (Integrated Circuit). This program may be supplied from the external server 14 or the like via the communication apparatus 22. The calculating section 82 can form a portion of the program with hardware (circuit components).

As shown in FIG. 1, the calculating section 82 includes a flight control section 90, an image capturing control section 92, and a display control section 94. The flight control section 90 performs flight control to control the flight of the drone 12. The flight control section 90 functions as a progression direction acquiring apparatus that acquires a progression direction D of the drone 12. The image capturing control section 92 performs image capturing control for controlling the image capturing of the camera 62.

The display control section 94 performs the display control to control the display of the display apparatus 28. The display control of the first embodiment includes flight information display control for controlling display concerning flight information If of the drone 12. With the flight information display control, the display of the display apparatus 28 that indicates the ground altitude H is switched based on the ground altitude H. Specifically, the display control section 94 displays the ground altitude H using emitted light colors C of a first lamp (light emitting section) 120 and a second lamp (light emitting section) 122 of the display apparatus 28. In other words, the display control section 94 can function as an altitude display control section that selectively provides the display of the display apparatus 28 based on the ground altitude H acquired by the altimeter 54. The altitude display control section displays the ground altitude H of the drone 12 by changing the emitted light colors C of the two or more light emitting sections 120 and 122. Furthermore, the display control section 94 displays the progression direction D of the drone 12 using the light emission order of the first lamp 120 and the second lamp 122 of the display apparatus 28, that is, the order of change of the light emission amount. In other words, the display control section 94 can function as a progression direction display control section that selectively provides the display of the display apparatus 28 based on the progression direction D acquired by the flight control section (progression direction acquiring apparatus) 90. The progression direction display control section can display the progression direction D of the drone 12 using the order of change of the light emission amounts of the two or more light emitting sections 120 and 122.

The storage section 84 stores the programs and data used by the calculating section 82, and includes a random access memory (referred to below as a "RAM"). A volatile memory such as a register and a nonvolatile memory such as a flash memory can be used as the RAM. Furthermore, the storage section 84 may include a read only memory (ROM) in addition to the RAM.

[A-1-5. Propeller Drive Section 26]

The propeller drive section 26 includes plurality of propellers 110a, 110b, 110c, and 110d (referred to below collectively as "propellers 110") and a plurality of propeller actuators 112a, 112b, 112c, and 112d (referred to collectively as "propeller actuators 112"). The propeller actuators 112 include electric motors, for example. In a case where the electric motors are AC motors, propeller actuators 112 may include inverters that convert DC current to AC current.

The number of propellers 110 (rotating wings) and propeller actuators 112 may be a number other than 4. As described above, the rotational velocity Np of each propeller 110 (also referred to below as the "propeller rotational velocity Np") is detected by the propeller sensor 60.

[A-1-6. Display Apparatus 28]

The display apparatus 28 provides the display outward from the drone 12. Here, the display is the flight information If of the drone 12. The ground altitude H and the progression direction D are included as the flight information If. The display apparatus 28 includes the first lamp 120 (also referred to below as the "front lamp 120") and the second lamp 122 (also referred to below as the "rear lamp 122").

As shown in FIG. 2, the front lamp 120 is arranged on the bottom surface 72 of the drone body 70 at a position farther forward in the progression direction D than the rear lamp 122. The rear lamp 122 is arranged on the bottom surface 72 of the drone body 70 at a position farther backward in the progression direction D than the front lamp 120. As described further below, the first lamp 120 and the second lamp 122 may be arranged at different locations. The front lamp 120 and the rear lamp 122 of the drone 12 are light emitting sections capable of color display (including a plurality of light emitting diodes (LEDs) that can output each of a plurality of colors, for example).

The combination of the front lamp 120 and the rear lamp 122 realizes both an altitude correspondence display section (altitude display section) 150 that provides a display corresponding to the ground altitude H and a progression direction display section 152 that displays the progression direction D of the drone 12.

<A-2. Control of the First Embodiment>

[A-2-1. Basics]

In the first embodiment, the flight control section 90 performs the flight control. Furthermore, the image capturing control section 92 performs the image capturing control. Yet further, the display control section 94 performs the display control (including flight information display control).

[A-2-2. Flight Control and Image Capturing Control]

The flight control causes the drone 12 to fly based on a flight command from the external server 14. The image capturing control captures an image of the surroundings of the drone 12 based on an image capturing command from the external server 14.

[A-2-3. Flight Information Display Control]

Figure 3:
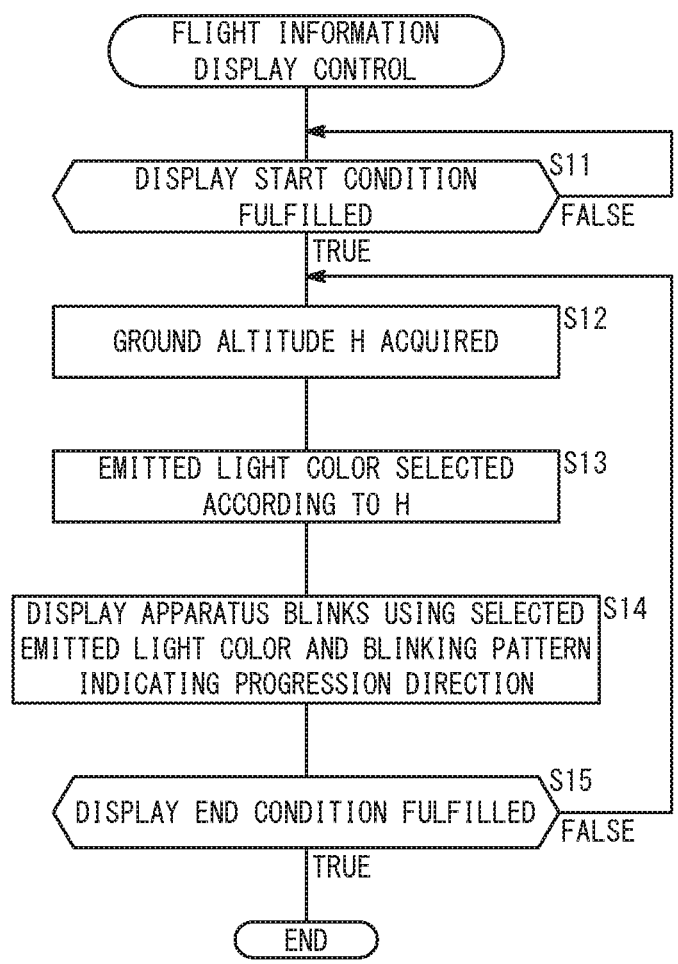
FIG. 3 is a flow chart of flight information display control in the first embodiment.

FIG. 3 is a flow chart of the flight information display control in the first embodiment. At step S11, the display control section 94 judges whether a condition for starting the display of the flight information If (display start condition) has been fulfilled. The start of the flight of the drone 12 can be used as the display start condition of the first embodiment. Alternatively, another condition (e.g., that the ground altitude H has become greater than or equal to a first altitude threshold value THh1) may be used as the display start condition.

Whether or not the flight of the drone 12 has started can be judged using the propeller rotational velocity Np and the acceleration G, for example. Specifically, it can be judged that flight has started when the propeller rotational velocity Np is greater than or equal to the rotational velocity threshold value THnp at which landing is possible and the acceleration Gz in the up-down direction is greater than or equal to an acceleration threshold value THgz indicating the ascent of the drone 12. Alternatively, the start of flight may be judged using only one of the propeller rotational velocity Np or the acceleration Gz in the up-down direction. Instead, the flight start can be judged using another method.

If the display start condition has been fulfilled (S11: TRUE), the process moves to step S12. If the display start condition is not fulfilled (S11: FALSE), step S11 is repeated.

At step S12, the display control section 94 acquires the ground altitude H from the altimeter 54. At step S13, the display control section 94 selects the emitted light color C of the front lamp 120 and the rear lamp 122, based on the ground altitude H. For example, the display control section 94 selects the emitted light color C as shown below.

When $0<H<THh1$, the color is red.
When $THh1 \leq H<THh2$, the color is yellow.
When $THh2 \leq H$, the color is blue.

At step S14, the display control section 94 causes the display apparatus 28 (front lamp 120 and rear lamp 122) to blink, using the emitted light color C selected at step S13 and a blinking pattern PN indicating the progression direction D. The display control section 94 acquires the progression direction D from the flight control section 90.

Figure 4:
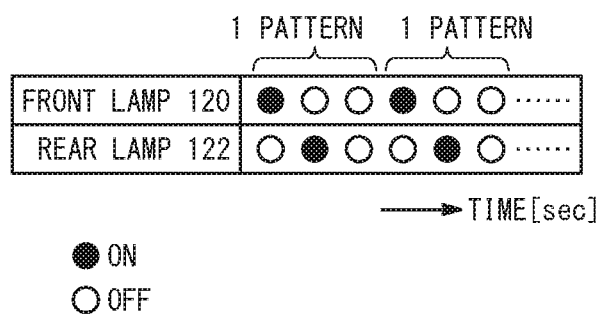
FIG. 4 shows an example of a blinking pattern of the display apparatus in the first embodiment.

FIG. 4 shows an example of the blinking pattern PN of the display apparatus 28 in the first embodiment. As shown in FIG. 4, first, in a state where the rear lamp 122 is OFF, the front lamp 120 is temporarily turned ON. Next, in a state where the front lamp 120 is OFF, the rear lamp 122 is temporarily turned ON, after which the front lamp 120 and the rear lamp 122 are turned OFF. This is one instance of the blinking pattern PN, and this blinking pattern PN is repeated. In other words, the portion that is lit moves from the front to the rear in the progression direction D. When people around the drone 12 see this blinking pattern PN, these people can recognize the progression direction D of the drone 12.

Returning to FIG. 3, at step S15, the display control section 94 judges whether a condition for ending the display of the flight information If (display end condition) has been fulfilled. The landing of the drone 12 can be used as the display end condition of the first embodiment. Alternatively, another condition (e.g., the ground altitude H becoming less than or equal to a second altitude threshold value THh2) may be used as the display end condition.

Whether or not the drone 12 has landed can be judged using the propeller rotational velocity Np, for example. Specifically, it can be judged that the drone 12 has landed when the propeller rotational velocity Np has become less than the rotational velocity threshold value THnp at which landing is possible. Alternatively, the landing of the drone 12 can be judged using another method.

If the display end condition is not fulfilled (S15: FALSE), the process returns to step S12. If the display end condition has been fulfilled (S15: TRUE), the current instance of the flight information display control ends.

<A-3. Effect of the First Embodiment>

According to the first embodiment, the display of the display apparatus 28 facing outward from the drone 12 (flying body) is performed selectively based on the altitude H (S13 and S14 of FIG. 3). In this way, people around the drone 12 can recognize the altitude H of the drone 12 from the ground.

In the first embodiment, the display apparatus 28 includes the altitude correspondence display section 150 that provides a display corresponding to the altitude H and the progression direction display section 152 that displays the progression direction D of the drone 12 (flying body) (FIG. 1). In this way, people around the drone 12 can recognize the altitude H and the progression direction D of the drone 12 from the ground.

In the first embodiment, the display apparatus 28 includes the front lamp 120 and the rear lamp 122 (light emitting sections) that realize both the altitude correspondence display section 150 and the progression direction display section 152 (FIGS. 1, 2, and 4). Furthermore, the display control section 94 (display control apparatus) displays the altitude H using the emitted light colors C of the front lamp 120 and the rear lamp 122 (S13 and S14 of FIG. 3). Furthermore, the display control section 94 displays the progression direction D of the drone 12 (flying body) using the blinking pattern PN (light emission order) of the front lamp 120 and the rear lamp 122 (S14 of FIG. 3 and FIG. 4). In this way, since the front lamp 120 and the rear lamp 122 (identical light emitting sections) indicate the altitude H and the progression direction D of the drone 12, the display apparatus 28 can be made more compact.

In the first embodiment, the drone 12 (flying body) includes the flight control section 90 (progression direction acquiring apparatus) that acquires the progression direction D of the drone 12 (FIG. 1). Furthermore, the display control section 94 (display control section) selectively provides the display of the display apparatus 28 based on the progression direction D (S14 of FIG. 3). In this way, people around the drone 12 can recognize the progression direction D of the drone 12 from the ground.

In the first embodiment, the display apparatus 28 includes the front lamp 120 and the rear lamp 122 (light emitting sections) for displaying the progression direction D. Furthermore, the display control section 94 (display control apparatus) displays the progression direction D of the drone 12 (flying body) using the blinking pattern PN (light emission order) of the front lamp 120 and the rear lamp 122 (S14 of FIG. 3 and FIG. 4). In this way, it is possible to indicate the progression direction D of the drone 12 with a simple configuration.

B. Second Embodiment

<B-1. Configuration (Differences from the First Embodiment)>
[B-1-1. Overall Configuration]

Figure 5:
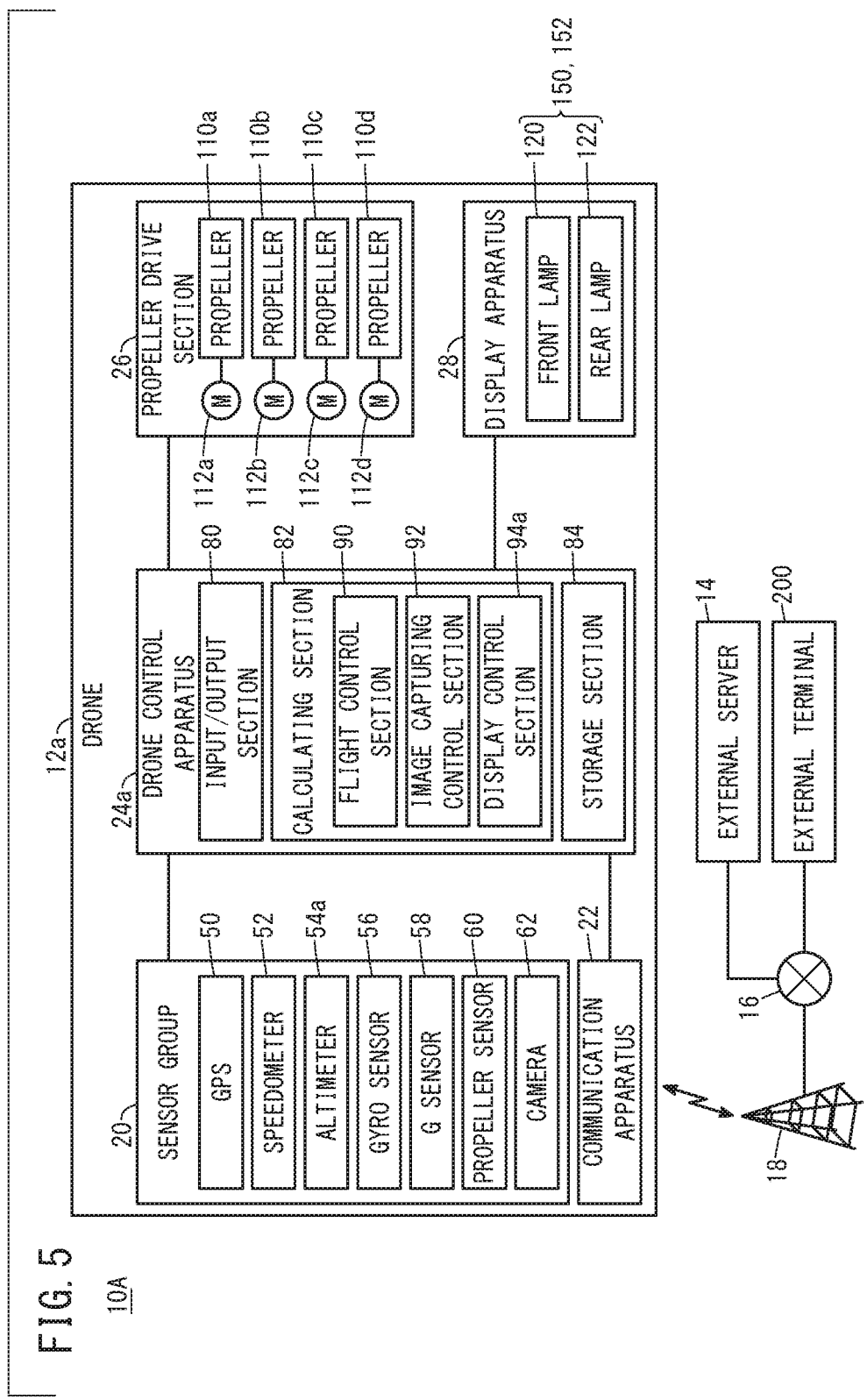
FIG. 5 is an overall configurational diagram of the basics of a drone system that includes a drone serving as a flying body, according to a second embodiment of the present invention.

FIG. 5 is an overall configurational diagram of the basics of a drone system 10A that includes a drone 12a serving as a flying body, according to a second embodiment of the present invention. The drone system 10A includes the external server 14 and an external terminal 200, in addition to the drone 12a.

[B-1-2. Drone 12a]

The drone 12a of the second embodiment basically has the same configuration as the drone 12 of the first embodiment. In the following description, configurational components that are the same as those of the first embodiment are given the same reference numerals, and detailed descriptions thereof are omitted.

The altimeter 54a of the second embodiment compensates for the error in the ground altitude H caused by the pitch P and roll R of the drone 12a. Furthermore, a display control section 94a of a drone control apparatus 24a of the second embodiment performs the flight information display control using the ground altitude H that has been detected with high accuracy due to the error being compensated for. Yet further, the display control section 94a of the second embodiment causes the display apparatus 28 to display the flight information If based on a flight information display command from the external terminal 200. In other words, if the flight instruction display command is not received, the flight information If is not displayed by the display apparatus 28.

Figure 6:
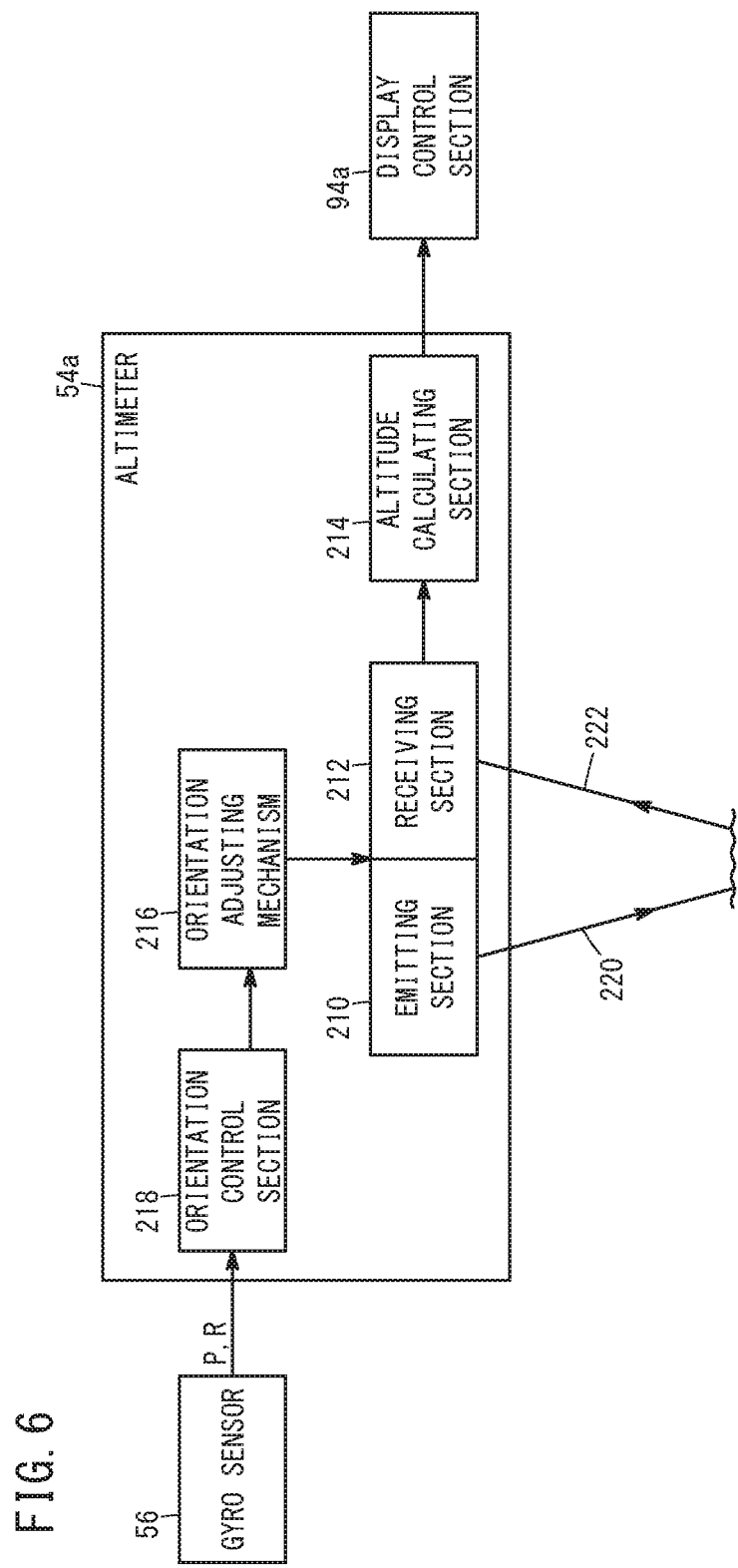
FIG. 6 is a descriptive diagram showing an altimeter and a surrounding configuration in the second embodiment.

FIG. 6 is a descriptive diagram showing the altimeter 54a and the surrounding configuration thereof in the second embodiment. FIG. 6 is also used as a descriptive diagram of a ground altitude detection process of the altimeter 54a. The altimeter 54a detects the ground altitude H using the TOF method. As shown in FIG. 6, the altimeter 54a includes the emitting section 210, the receiving section 212, the altitude calculating section 214, an orientation adjusting mechanism 216, and an orientation control section 218.

The emitting section 210 emits a transmission wave 220 (electromagnetic wave) toward the ground surface (e.g., the ground surface below the drone 12a). The receiving section 212 receives a reflection wave 222 caused by the transmission wave 220 being reflected from the ground surface therebelow. The altitude calculating section 214 calculates the ground altitude H based on the reflection wave 222. The altitude calculating section 214 outputs the calculated ground altitude H to the display control section 94a of the drone control apparatus 24a.

The orientation adjusting mechanism 216 adjusts the orientations of the emitting section 210 and the receiving section 212. The orientation control section 218 controls the orientation adjusting mechanism 216 based on the pitch P and the roll R, in a manner to orient the emitting section 210 and the receiving section 212 in the direction of gravity. The altimeter 54 of the first embodiment includes the emitting section 210, the receiving section 212, and the altitude calculating section 214 that are the same as those of the altimeter 54a of the second embodiment, but it should be noted that the altimeter 54 does not include the orientation adjusting mechanism 216 and the orientation control section 218.

[B-1-3. External Terminal 200]

The external terminal 200 is capable of communicating with the drone 12a via the Internet 16 and the wireless relay station 18. Furthermore, the external terminal 200 transmits the flight information display command to the drone 12a in response to a manipulation input from a user of the external terminal 200. A smartphone, laptop computer, or the like can be used as the external terminal 200.

<B-2. Control of the Second Embodiment>
[B-2-1. Basics]

The control of the second embodiment is basically the same as the control of the first embodiment. That is, the flight control and image capturing control of the second embodiment are the same as those of the first embodiment. On the other hand, the orientation control section 218 of the altimeter 54a of the second embodiment performs the ground altitude detection process for detecting the ground altitude H with high accuracy using the orientation adjusting mechanism 216. Furthermore, in the flight information display control of the second embodiment, the high-accuracy ground altitude H detected through the ground altitude detection process is used.

[B-2-2. Ground Altitude Detection Process]

The ground altitude detection process is described while referencing FIG. 6. The orientation control section 218 acquires the pitch P and roll R of the drone 12a from the gyro sensor 56. The orientation control section 218 then causes the orientation adjusting mechanism 216 to operate according to the pitch P and roll R. Specifically, the orientation control section 218 controls the orientation adjusting mechanism 216 based on the pitch P and roll R in a manner to orient the emitting section 210 and the receiving section 212 in the direction of gravity.

When the drone 12a starts flying, the emitting section 210 and the receiving section 212 are basically oriented in the direction of gravity (including at an angle very close to the direction of gravity). When the pitch P changes while the drone 12a is in flight, the orientation control section 218 causes the orientation adjusting mechanism 216 to operate in a manner to keep the emitting section 210 and the receiving section 212 oriented in the direction of gravity (a manner to cancel out the change in the pitch P (or the change in the angle of the pitch direction)). In the same manner, when the roll R changes while the drone 12a is in flight, the orientation control section 218 causes the orientation adjusting mechanism 216 to operate in a manner to keep the emitting section 210 and the receiving section 212 oriented in the direction of gravity (a manner to cancel out the change in the roll R (or the change in the angle of the roll direction)).

[B-2-3. Flight Information Display Control]

The basic flow of the flight information display control in the second embodiment is the same as that of the flight information display control of the first embodiment (FIG. 3). Therefore, the flight information display control of the second embodiment is also described using FIG. 3. However, while the start of the flight of the drone 12 is used as the display start condition in the first embodiment (S11 of FIG. 3), the reception of the flight information display command from the external terminal 200 is used as the display start condition in the second embodiment. Furthermore, since the orientations of the emitting section 210 and the receiving section 212 are adjusted according to the pitch P and the roll R in the second embodiment, the ground altitude H used in the second embodiment is more accurate than the ground altitude H used in the first embodiment.

<B-3. Effect of the Second Embodiment>

According to the second embodiment described above, it is possible to realize the effects described below, instead of or in addition to the effects of the first embodiment.

Essentially, in the second embodiment, the altimeter 54a includes the emitting section 210 that emits the transmission wave 220 (electromagnetic wave) toward the ground surface, the receiving section 212 that receives the reflection wave 222 of the transmission wave 220, and the altitude calculating section 214 that calculates the altitude H based on the reflection wave 222 (FIG. 6). Furthermore, the drone 12a (flying body) includes the gyro sensor 56 (posture detecting section) that detects the pitch P and roll R of the drone 12a, the orientation adjusting mechanism 216 that adjusts the orientations of the emitting section 210 and the receiving section 212, and the orientation control section 218 that controls the orientation adjusting mechanism 216 based on the pitch P and roll R in a manner to orient the emitting section 210 and the receiving section 212 in the direction of gravity (FIG. 6). In this way, it is possible to decrease the detection error for the altitude H caused by the pitch P and roll R.

In the second embodiment, the drone 12a (flying body) includes the communication apparatus 22 that is capable of performing wireless communication with the external terminal 200 (external device) (FIG. 5). Furthermore, the display control section 94a (display control apparatus) provides the display of the display apparatus 28 that indicates the altitude H (S14) when the flight information display command (altitude display command) is received from the external terminal 200 via the communication apparatus 22 (S11 of FIG. 3: TRUE). In this way, it is possible to switch the display aspect of the display apparatus 28 as needed.

C. Modifications

The present invention is not limited to the above-described embodiments, and it goes without saying that various modifications could be adopted therein based on the content included in the Specification. For example, the configurations described below can be adopted.

<C-1. Flying Body>

The drone 12 of the first embodiment is used for image capturing (FIGS. 1 and 2). However, from the viewpoint of switching the display of the display apparatus 28 communicating the flight information If such as the ground altitude H based on the flight information If, for example, the present invention is not limited to this. As an example, the drone 12 can also be used for purposes such as transporting packages and advertising.

In the first embodiment, the present invention is applied to the drone 12 (FIGS. 1 and 2). However, from the viewpoint of switching the display of the display apparatus 28 communicating the flight information If such as the ground altitude H based on the flight information If, for example, the present invention may be applied to another type of flying body. As an example, the present invention can be applied to a helicopter instead of the drone 12. The same is true for the second embodiment.

The drone 12 of the first embodiment flies according to the flight command from the external server 14. However, from the viewpoint of switching the display of the display apparatus 28 communicating the flight information If such as the ground altitude H based on the flight information If, for example, the present invention is not limited to this. As an example, the drone 12 may fly according to a manipulation input made by a user to a remote control (not shown in the drawings). The same is true for the second embodiment.

<C-2. Rotating Wings>

In the first embodiment, the propellers 110 are used as the rotating wings that generate lift (FIGS. 1 and 2). However, from the viewpoint of generating lift, for example, it is possible to use other rotating wings (e.g., a rotor for a helicopter). The same is true for the second embodiment. Furthermore, the present invention can be applied to a flying body that flies without using rotating wings (e.g., a flying body that can achieve lift through engine propulsion). The same is true for the second embodiment.

<C-3. Display Apparatus 28>

The display apparatus 28 of the first embodiment includes the front lamp 120 and the rear lamp 122 as two light emitting sections (FIGS. 1 and 2). However, from the viewpoint of switching the display of the display apparatus 28 communicating the flight information If such as the ground altitude H based on the flight information If, for example, the present invention is not limited to this. As an example, three or more light emitting sections may be provided to communicate the ground altitude H and the progression direction D. Alternatively, a single lamp may be provided to communicate the ground altitude H according to the emitted light color C. A film or the like shaped as an arrow may be provided in a window portion exposed to the outside, in order to communicate the progression direction D with the single lamp. The same is true for the second embodiment. Alternatively, instead of a lamp, a display panel such as a liquid crystal panel or an organic EL panel may be used as the display apparatus 28. The same is true for the second embodiment.

In the first embodiment, the front lamp 120 and the rear lamp 122 are provided on the bottom surface 72 of the drone body 70 (FIG. 2). However, from the viewpoint of switching the display of the display apparatus 28 communicating the flight information If such as the ground altitude H based on the flight information If, for example, the present invention is not limited to this. As an example, the front lamp 120 and the rear lamp 122 may be provided on a leg portion 240 (particularly at the tip thereof) (FIG. 2) of the drone 12. In this way, even when a package is held below the drone body 70, people can see the front lamp 120 and the rear lamp 122. The same is true for the second embodiment.

In the display apparatus 28 of the first embodiment, the front lamp 120 and the rear lamp 122 form both the altitude correspondence display section 150 and the progression direction display section 152 (FIG. 1). However, from the viewpoint of communicating the ground altitude H and the progression direction D of the drone 12 to the outside, for example, the present invention is not limited to this. As an example, a lamp for the altitude correspondence display section 150 and a lamp for the progression direction display section 152 can be provided separately. The same is true for the second embodiment.

<C-4. Altimeters 54 and 54a>

The altimeter 54 of the first embodiment detects the ground altitude H using the TOF method. However, from the viewpoint of acquiring the ground altitude H, for example, the present invention is not limited to this, and another detection principle may be used. A method utilizing the Doppler effect can be used as this other detection principle. Alternatively, the ground altitude H may be acquired based on the output of the GPS sensor 50 or air pressure detected by an air pressure sensor (not shown in the drawings).

<C-5. Flight Information Display Control>

In the flight information display control of the first embodiment, the ground altitude H and the progression direction D of the drone 12 are displayed (FIG. 3). However, from the viewpoint of giving notification of the flight information If to the outside from the drone 12, for example, the present invention is not limited to this. For example, only one of the ground altitude H and the progression direction D can be notified. Alternatively, display of the display apparatus 28 giving notification of the flight velocity Vd of the drone 12 can be switched based on the flight velocity Vd. The same is true for the second embodiment.

In the flight information display control of the first embodiment, the ground altitude H of the drone 12 is indicated by the emitted light color C of the display apparatus 28 (S13 of FIG. 3). However, from the viewpoint of switching the display of the display apparatus 28 communicating the ground height H based on the ground height H, for example, the present invention is not limited to this. As an example, it is possible to indicate the ground altitude H using the blinking intervals of the light emitting sections of the front lamp 120 or the rear lamp 122. For example, the blinking intervals can be shortened when the ground altitude H is low, and the blinking intervals can be lengthened when the ground altitude H is high. Alternatively, in a case where the display apparatus 28 includes a display panel, the actual numerical value of the ground altitude H can be displayed. The same is true for the second embodiment.

In the flight information display control of the first embodiment, the progression direction D of the drone 12 is indicated by the blinking pattern PN of the display apparatus 28 (S14 of FIG. 3 and FIG. 4). However, from the viewpoint of switching the display of the display apparatus 28 communicating the progression direction D based on the progression direction D, for example, the present invention is not limited to this. As an example, it is possible to provide a lamp inside an arrow-shaped exposed portion (glass portion or the like), and to indicate the progression direction D by turning this lamp ON and OFF. The same is true for the second embodiment.

<C-6. Ground Altitude Detection Process (FIG. 6)>

In the ground altitude detection process of the second embodiment (FIG. 6), the orientation adjusting mechanism 216 is controlled using both the pitch P and the roll R of the drone 12a. However, from the viewpoint of adjusting the orientation of the altimeter 54a (emitting section 210 and receiving section 212) according to the posture of the drone 12a, for example, the present invention is not limited to this. As an example, the orientation adjusting mechanism 216 can be controlled using only one of the pitch P or the roll R.

In the above embodiments, an example is described of a case in which the light emitting sections 120 and 122 blink, but the present invention is not limited to this. The light emission amounts of the light emitting sections 120 and 122 may be arbitrarily changed, without completely turning OFF the light emitting sections 120 and 122. In this way, the display apparatus 28 may include two or more light emitting sections 120 and 122 that each have a light emission amount and an emitted light color C that can be changed.

Furthermore, the drone 12 may include an other-machine velocity acquiring apparatus that acquires an other-machine velocity that is the velocity of another flying body (not shown in the drawings) positioned near the drone 12. The other-machine velocity may be the absolute velocity of another flying body, or may be the velocity of another flying body relative to the drone 12. The calculating section 82 can function as the other-machine velocity acquiring apparatus. The calculating section 82, i.e., the other-machine velocity acquiring apparatus, can acquire the other-machine velocity based on information acquired by a velocity sensor or the like (not shown in the drawings) included in the sensor group 20. The display control section 94 can function as a for-other-machine display control section that selectively provides the display of the display apparatus 28 based on the other-machine velocity acquired by the other-machine velocity acquiring apparatus. The for-other-machine display control section can change the light emission amounts of the light emitting sections 120 and 122 based on the other-machine velocity. The for-other-machine display control section changes the light emission amounts of the light emitting sections 120 and 122 such that the light emission amounts of the light emitting sections 120 and 122 at a timing when the other-machine velocity is a first velocity becomes greater than the light emission amounts of the light emitting sections 120 and 122 at a timing when the other-machine velocity is a second velocity that is less than the first velocity. When the other-machine velocity is relatively high, the light emission amounts of the light emitting sections 120 and 122 are relatively high, and therefore, even when there is a large distance between the drone 12 and the other flying body, it is possible for this other flying body to recognize the display of the display apparatus 28. Accordingly, with such a configuration, it is possible to improve the flight safety.

The drone 12 may include an other-machine distance acquiring apparatus that acquires other-machine distance that is the distance between the drone 12 and another flying body (not shown in the drawings) positioned near the drone 12. The calculating section 82 can function as the other-machine distance acquiring apparatus. The calculating section 82, i.e., the other-machine distance acquiring apparatus, can acquire the other-machine distance based on information acquired by a distance sensor or the like (not shown in the drawings) included in the sensor group 20. The display control section 94 can function as a for-other-machine display control section that selectively provides the display of the display apparatus 28 based on the other-machine distance acquired by the other-machine distance acquiring apparatus. The for-other-machine display control section can change the light emission amounts of the light emitting sections 120 and 122 based on the other-machine distance. The for-other-machine display control section changes the light emission amounts of the light emitting sections 120 and 122 such that the light emission amounts of the light emitting sections 120 and 122 at a timing when the other-machine distance is a first distance becomes greater than the light emission amounts of the light emitting sections 120 and 122 at a timing when the other-machine distance is a second distance that is less than the first distance. When the other-machine distance is relatively large, the light emission amounts of the light emitting sections 120 and 122 are relatively high, and therefore, even when there is a large distance between the drone 12 and the other flying body, it is possible for this other flying body to recognize the display of the display apparatus 28. Accordingly, with such a configuration, it is possible to improve the flight safety.

Figure 7:
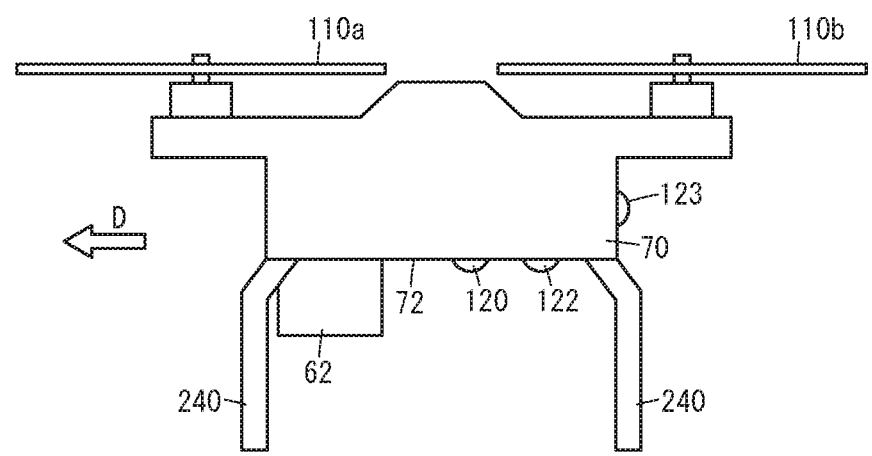
FIG. 7 is a side view schematically showing an outer appearance of a drone according to a modification.

The drone body 70 may be provided with a light emitting section 123 that is separate from the light emitting sections 120 and 122. In this case, the light emitting section 120 and 122 can be used as the progression direction display section 152. On the other hand, the light emitting section 123 can be used as the altitude correspondence display section 150. FIG. 7 is a side view schematically showing an outer appearance of a drone according to a modification. As shown in FIG. 7, the drone 123 may be provided on a side portion of the drone body 70.

The light emitted from the light emitting sections 120 and 122 is not limited to being visible light. Light in a wavelength region outside the visible light region may be emitted from the light emitting sections 120 and 122.

Optical communication may be performed using the light emitted from the light emitting sections 120 and 122.

REFERENCE SIGNS LIST 12, 12a: drone (flying body)
22: communication apparatus
28: display apparatus
54, 54a: altimeter (altitude acquiring apparatus)
56: gyro sensor (posture detecting section)
90: flight control section (progression direction acquiring apparatus)
94, 94a: display control section (display control apparatus)
120: front lamp (light emitting section)
122: rear lamp (light emitting section)
123: light emitting section
150: altitude correspondence display section
152: progression direction display section
200: external terminal (external device)
210: emitting section
212: receiving section
214: altitude calculating section
216: orientation adjusting mechanism
218: orientation control section
220: transmission wave (electromagnetic wave)
222: reflection wave
C: emitted light color
D: progression direction
H: ground altitude
P: pitch
R: roll

The invention claimed is:

1. A flying body comprising a display apparatus configured to provide a display facing outward from the flying body and a display control apparatus configured to control the display apparatus, wherein:
    the flying body further comprises an altitude acquiring apparatus configured to acquire an altitude as a distance to a ground surface;
    the display control apparatus includes an altitude display control section configured to selectively perform display of the display apparatus based on the altitude acquired by the altitude acquiring apparatus;
    the flying body further comprises a progression direction acquiring apparatus configured to acquire a progression direction of the flying body;
    the display control apparatus further includes a progression direction display control section configured to selectively perform the display of the display apparatus based on the progression direction acquired by the progression direction acquiring apparatus;
    the display apparatus includes two or more light emitting sections each having a light emission amount and an emitted light color that are changeable;
    the progression direction display control section is configured to display the progression direction of the flying body using an order of change of the light emission amounts of the two or more light emitting sections; and
    the altitude display control section is configured to display the altitude of the flying body using a change of the emitted light colors of the light emitting sections.

2. The flying body according to claim 1, wherein the altitude acquiring apparatus includes:
    an emitting section configured to emit an electromagnetic wave toward the ground surface;
    a receiving section configured to receive a reflection wave of the electromagnetic wave; and
    an altitude calculating section configured to calculate the altitude based on the reflection wave, and
    the flying body comprises:
    a posture detecting section configured to detect pitch or roll of the flying body;
    an orientation adjusting mechanism configured to adjust orientations of the emitting section and the receiving section; and
    an orientation control section configured to control the orientation adjusting mechanism based on the pitch or the roll in a manner to orient the emitting section and the receiving section in a direction of gravity.

3. The flying body according to claim 1, wherein the flying body comprises a communication apparatus configured to perform wireless communication with an external device, and
the display control apparatus performs the display of the display apparatus indicating the altitude when an altitude display command is received from the external device via the communication apparatus.

4. A control method of a flying body including a display apparatus including two or more light emitting sections each having a light emission amount and an emitted light color that are changeable and being configured to provide a display facing outward from the flying body; a display control apparatus configured to control the display apparatus; an altitude acquiring apparatus configured to acquire an altitude as a distance to a ground surface; and a progression direction acquiring apparatus configured to acquire a progression direction of the flying body, the control method comprising:
acquiring the altitude of the flying body by the altitude acquiring apparatus;
acquiring the progression direction of the flying body by the progression direction acquiring apparatus; and
displaying the progression direction of the flying body using an order of change of the light emission amounts of the two or more light emitting sections and displaying the altitude of the flying body using a change of the emitted light colors of the light emitting sections.

5. A flying body comprising a display apparatus configured to provide a display facing outward from the flying body and a display control apparatus configured to control the display apparatus, wherein:
the flying body further comprises a progression direction acquiring apparatus configured to acquire a progression direction in which the flying body is progressing;
the display control apparatus includes a progression direction display control section configured to selectively perform display of the display apparatus based on the progression direction acquired by the progression direction acquiring apparatus;
the display apparatus includes two or more light emitting sections each having a light emission amount that is changeable; and
the progression direction display control section is configured to display the progression direction of the flying body by varying an order of change of the light emission amounts of the two or more light emitting sections based on the progression direction.

6. A control method of a flying body including a display apparatus including two or more light emitting sections each having a light emission amount that is changeable and configured to provide a display facing outward from the flying body; a display control apparatus configured to control the display apparatus; and
a progression direction acquiring apparatus configured to acquire a progression direction in which the flying body is progressing, the control method comprising:
acquiring a progression direction in which the flying body is progressing, by the progression direction acquiring apparatus, and
displaying the progression direction of the flying body by varying an order of change of the light emission amounts of the two or more light emitting sections.

7. A flying body comprising a display apparatus configured to provide a display facing outward from the flying body and a display control apparatus configured to control the display apparatus, wherein:
the flying body further comprises an other-machine velocity acquiring apparatus configured to acquire an other-machine velocity that is a velocity of another flying body positioned near the flying body;
the display control apparatus includes a for-other-machine display control section configured to selectively perform display of the display apparatus based on the other-machine velocity acquired by the other-machine velocity acquiring apparatus;
the display apparatus includes a light emitting section having a light emission amount that is changeable and for being recognized by the another flying body;
the for-other-machine display control section is configured to change the light emission amount of the light emitting section based on the other-machine velocity; and
the for-other-machine display control section is configured to change the light emission amount of the light emitting section in a manner that the light emission amount of the light emitting section at a timing when the other-machine velocity is a first velocity becomes greater than the light emission amount of the light emitting section at a timing when the other-machine velocity is a second velocity that is less than the first velocity.

8. A control method of a flying body including a display apparatus including a light emitting section having a light emission amount that is changeable and for being recognized by another flying body positioned near the flying body, and configured to provide a display that faces outward from the flying body; a display control apparatus configured to control the display apparatus; and an other-machine velocity acquiring apparatus configured to acquire an other-machine velocity that is a velocity of the another flying body, the control method comprising:
acquiring the other-machine velocity by an other-machine velocity acquiring apparatus, and
changing the light emission amount of the light emitting section based on the other-machine velocity,
in changing the light emission amount, the control method changes the light emission amount of the light emitting section in a manner that the light emission amount of the light emitting section at a timing when the other-machine velocity is a first velocity becomes greater than the light emission amount of the light emitting section at a timing when the other-machine velocity is a second velocity that is less than the first velocity.

9. A flying body comprising a display apparatus configured to provide a display facing outward from the flying body and a display control apparatus configured to control the display apparatus, wherein:
the flying body further comprises an other-machine distance acquiring apparatus configured to acquire an other-machine distance that is a distance between the flying body and another flying body positioned near the flying body;
the display control apparatus includes a for-other-machine display control section configured to selectively perform display of the display apparatus based on the other-machine distance acquired by the other-machine distance acquiring apparatus;
the display apparatus includes a light emitting section having a light emission amount that is changeable and for being recognized by the another flying body;

the for-other-machine display control section is configured to change the light emission amount of the light emitting section based on the other-machine distance; and the for-other-machine display control section is configured to change the light emission amount of the light emitting section in a manner that the light emission amount of the light emitting section at a timing when the other-machine distance is a first distance becomes greater than the light emission amount of the light emitting section at a timing when the other-machine distance is a second distance that is less than the first distance.

10. A control method of a flying body including a display apparatus including a light emitting section having a light emission amount that is changeable and for being recognized by another flying body positioned near the flying body, and being configured to provide a display facing outward from the flying body; a display control apparatus configured to control the display apparatus; and an other-machine distance acquiring apparatus configured to acquire an other-machine distance that is a distance between the flying body and the another flying body, the control method comprising:

acquiring the other-machine distance by the other-machine distance acquiring apparatus, and changing the light emission amount of the light emitting section based on the other-machine distance, in changing the light emission amount, the control method changes the light emission amount of the light emitting section in a manner that the light emission amount of the light emitting section at a timing when the other-machine distance is a first distance becomes greater than the light emission amount of the light emitting section at a timing when the other-machine distance is a second distance that is less than the first distance.

* * * * *